April 21, 1936.    W. W. LILLARD    2,037,728
RESILIENT DEVICE
Filed Nov. 23, 1933    3 Sheets-Sheet 1

April 21, 1936.                    W. W. LILLARD                       2,037,728
                                  RESILIENT DEVICE
                               Filed Nov. 23, 1933              3 Sheets-Sheet 2

INVENTOR
Wm. W. Lillard.

April 21, 1936.  W. W. LILLARD  2,037,728
RESILIENT DEVICE
Filed Nov. 23, 1933   3 Sheets-Sheet 3

INVENTOR
Wm. W. Lillard

Patented Apr. 21, 1936

2,037,728

UNITED STATES PATENT OFFICE 2,037,728

RESILIENT DEVICE

William W. Lillard, Midland Park, N. J.

Application November 23, 1933, Serial No. 699,379

22 Claims. (Cl. 267—20)

The present invention relates generally to means for increasing the effect of a force applied to an object, and more particularly to resilient devices.

An object of the present invention is to provide a spring-powered resilient device which has a large ultimate resilience, i. e. resistance to being extended to its full extent of movement.

Another object of the present invention is to provide a simple, spring-powered, resilient device which will permit a relatively long range of movement of the members of the spring device to which are applied the forces to be resisted by the device.

Another object of the invention is the provision of a resilient spring device suitable for absorbing airplane landing shocks.

A further object of the invention is the provision of a simple resilient spring device having effective governor means for controlling its rate of extension under the action of forces which it resists, or its rate of return movement due to the power of the resilient spring.

According to one way of carrying out my invention, a plurality of angularly disposed linkages and a spring are so combined in a structure that forces so applied to one of said linkages as to tend to straighten it are resisted by the power of the spring multiplied many times.

A feature of my invention resides in the provision of a resilient device capable of producing a large ultimate resistance, the speed of movement of which device may be controlled by a relatively weak governor means.

Another feature of my invention resides in the provision of a resilient device in which during the initial portion of the work movement, the friction to be overcome in the device is very small, and during the final portion of the work movement a large force is required to extend the same against the resistance resulting from friction alone.

The present application is a continuation in part of my application Serial Number 364,296, filed May 18, 1929.

In the drawings which illustrate my invention.

Figures 1, 2, 3, 4, 5, 6, 7, 8, 9, 10:
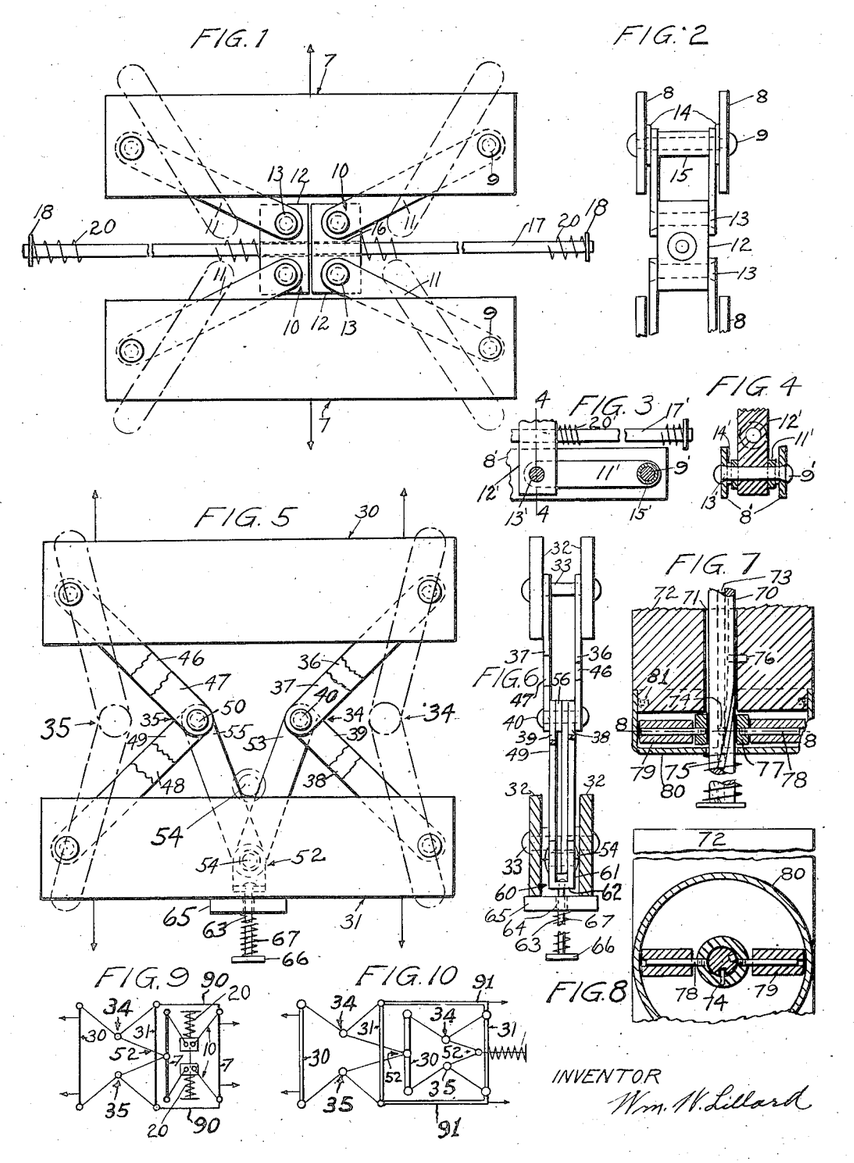
Figure 1 is a side view, broken away in part, of a spring device wherein the axis of the springs employed is transverse to the direction of the forces acting on the device. In this view, dot-and-dash outlines of the links indicate operative position of the same.
Figure 2 is a fragmentary end view of the structure shown in Figure 1.
Figure 3 is a fragmentary side view of a spring device similar to the device shown in Figure 1, only as much of the device being shown as is needed to illustrate a starting position of links from which certain advantages result.
Figure 4 is a section taken along the line 4—4 of Figure 3.
Figure 5 is a side view, broken away in part, of another embodiment of my invention. The dot-and-dash outlines of the links indicate operative positions the links may take.
Figure 6 is an end view, broken away in part, of the structure shown in Figure 5.
Figure 7 is a sectional view to an enlarged scale through a governor device which may be applied to certain forms of the spring device of the present invention.
Figure 8 is a partial sectional view taken along the line 8—8 of Figure 7.
Figures 9 and 10 are diagrammatic views illustrating structures embodying my invention which are provided by combining the devices shown in Figures 1 and 5 in certain ways.

According to one embodiment of the present invention, a structure may be employed which includes two bar elements disposed in parallelism; the end of one bar being positioned opposite the end of the other, and one end of one bar being connected by a linkage to the adjacent, i. e. directly opposite, end of the other bar. In one unitary form the invention may take as illustrated in Figure 1, the bar elements, hereinafter called "pull bars" are generally designated as 7 and may each be made up of two parallel plates 8 fastened together by shoulder rivets 9, the shoulders of the rivets serving to space the plates a short distance apart. It will be seen as the description proceeds that the "pull bar" elements of my invention may be constructed in various ways without departing from the scope of my invention.

Forces represented by the arrows will act in opposite directions on the pull bars 7. It will be understood that any suitable means may be employed for applying the forces to the pull bars. Two sets of linkages generally represented as 10 are each composed of four links 11 and a connecting member or cross-head 12. The outer end of each link is perforated for engaging around the portion of the rivet 9 between the plates 8. The inner ends of said links may be pivotally connected to the cross-head 12 by bolts or pins 13 whose heads may be countersunk flush with the sides of the links 11. It will be seen from inspection of Figure 2 that two linkages 11 are disposed, one on each side of the cross-head 12. For reducing friction each link may be spaced away from its adjacent plate 8 by a collar 14 around the adjacent rivet 9, and a spacing collar 15 may be slipped over the rivet and disposed between the outer ends of two adjacent links.

Each cross-head 12 may have a hole 16 therethrough centrally located between its four sides, the axis of the hole being parallel to an imaginary plane through the axes of the rivets 9 in each pull bar 10. A rod 17 may fit loosely in the holes 16 and may have a collar 18 adjacent each end securely fastened in any suitable way. A simple helical compression spring 20 is disposed between each member 12 and its adjacent collar 18. Each spring will have an initial tension which will be determined by the character of the service to which the spring device will be put.

When forces are applied in opposite directions to the pull bars 7 as indicated by the arrows each of the linkages 10 will tend to straighten out, and to cause the compression of the springs 20. The lengths of the rod 17 and the springs 20 will be such that the springs 20 will never be closed even though both linkages 10 are substantially straightened. It will be understood by those skilled in the resolution of forces that the forces which tend to move the pull bars 7 away from each other will be resisted by a strong force created by the springs 20 acting on the linkages 10 when the linkages are substantially straightened.

It can be seen by those skilled in the resolution of forces that a spring device employing the operating principle of the device shown in Figures 1 and 2 can be arranged as illustrated in Figures 3 and 4. The parts shown in Figures 3 and 4 and designated as 9', 11', 12', 13', 14', 15', 17', and 20' have functions like the parts shown in Figures 1 and 2 and designated as 9, 11, 12, 13, 14, 15, 17, and 20, respectively.

One advantage of the arrangement shown in Figures 3 and 4 is that a maximum movement of the pull bars away from each other is permitted. Another advantage is that during a considerable range of the pull bars away from their starting (Figure 3) position, their movements will be resisted by forces which will increase very slowly. Thus simple means are provided whereby a movement of a part in a machine can be opposed for a considerable distance by a substantially uniform force instead of a constantly increasing force as occurs as when ordinary springs are used.

It can be readily seen from inspection of my copending application Serial Number 297,659 filed August 6, 1928 that a tensile spring may be disposed between the cross-heads 12 and connected to each, and thus replace both compression springs 20, which may be advantageous in certain cases.

Another form the present invention may take is illustrated in Figures 5 and 6 and includes two pull bars 30 and 31, each of which may be constructed similarly to the pull bars 7 and include two parallel plates 32 connected by shoulder rivets 33. The right end of the pull bar 30 (as viewed in Figure 5) is connected to the adjacent (oppositely disposed) end of the pull bar 31 by a linkage generally designated as 34. The left end of the pull bar 30 is connected to the adjacent (oppositely disposed) end of the pull bar 31 by a linkage generally designated as 35. Each linkage 34 may include a link 36 and a parallel duplicate link 37, each apertured for loosely engaging about a rivet 33 employed for fastening together the plates 32, and may further include a link 38 and a parallel duplicate link 39 each apertured for loosely engaging about a rivet 33 of the pull bar 31. The inner end of each of the links 36, 37, and 38, 39 is apertured for loosely engaging about a pivotal connecting pin 40.

It will be noted from inspection of Figure 6 that the links 36 and 37 are positioned, one at each side of the links 38 and 39 which two last named links are positioned apart for a reason to presently appear. Each linkage 35 includes links 46, 47, and 48, 49 and a pivotal connecting pin 50 which may be a duplicate of the pin 40. The links 46, 47 and 48, 49 may be duplicates of and arranged similarly to the links 36, 37 and 38, 39 respectively.

It is a feature of the present invention to connect the linkages 34 and 35 by another linkage generally designated as 52 instead of by springs, etc. as described above with respect to Figure 1. The linkage 52 may include a link 53 having each end apertured, one end to engage around the pin 40 between the links 38 and 39, and the other end to engage around a pivotal connection pin 54. The linkage 52 may further include a link 55 having each end apertured, one end to engage around the pin 50 between the links 48 and 49 and the other end around the pin 54. As illustrated in Figure 6, a spacing collar 56 is disposed around the pin 40 between the links 39 and 53. A similarly placed collar (not shown) may be used around the pin 50. It can be readily seen that instead of making the linkages 34 and 35, each out of four links, these linkages may each have but two links which will be preferably formed to have their lengthwise axes lie in the same plane.

Another feature of the present invention is the provision of means in a linkage spring resilient device wherein a simple helical spring which is to be strained for storing or originating the return force may be disposed with the axis parallel to the direction of the forces pulling on the device. To this end, a clevis member 60 has its two arms 61 apertured for loosely engaging around the pin 54, one arm being disposed against the outer face of the link 52 and the other arm against the outer face of the link 53. Suitable means such as enlarged heads for the pin 54 may be employed for holding the clevis in engagement on the linkage 52 against displacement therefrom.

To an end member 62 of the clevis 60, may be fastened as by riveting, a rod 63 which may extend outwardly (downwardly as viewed in Figures 5 and 6) between the plates 32 of the pull bar 31 and passed through an oversized hole 64 in a plate 65 which may be secured in place against the outer edges of the plates 32 as by welding. To the lower end of the rod 63 may be fastened as by riveting a collar or flange 66, and a helical compression spring 67 having a predetermined amount of initial compression may be disposed around the rod 63 between the plate 65 and the collar 66.

It can be readily seen that when the pull bars 30 and 31 are pulled away from each other the linkages 34 and 35 will tend to straighten out, and the linkage 52 will also tend to straighten, and the spring 67 will be compressed. The force of the compressed spring will resist the tendency of the linkage 52 to straighten and the power which it is necessary to apply to the outer end of the links 53 and 55 to overcome the force of the compressed spring 67 will be large when the links 53 and 55 are nearly in alignment.

It can be seen from inspection of Figure 5 that the forces which will tend to straighten the linkage 52 will result from the straightening of the linkages 34 and 35. It can be further seen by those skilled in resolution of forces that when the linkages 34 and 35 are nearly straightened and the linkage 52 is also nearly straightened that the force of the compressed spring 67 acting through the linkage 52 provides very great resistance to the forces acting on the pull bars 30 and 31 which tend to straighten the linkages 34 and 35.

It is a feature of the present invention to provide means for controlling the speed of both the yielding and return movement of the spring devices described herein. In carrying out this feature, a round spring guide rod 70 (see Figures 7 and 8) is provided and may replace either the rod 17 or the rod 63 when the governor feature is desired. The rod 70 may be disposed with a loose running fit in a hole 71 in a non-revoluble member 72 which may be made in a form to replace the cross-heads 12 or in a form to replace the plate 65. The rod 70 may have a straight lengthwise groove 73 in which may engage with a running fit a pin 74. The rod 70 may also have cut in its periphery a winding or spiral-like groove 75 in which may engage with a running fit a pin 76, fastened rigidly in the member 72. The pin 74 is fastened securely in a collar 77 which engages loosely around the rod 70 at the outer end of the member 72, and engages loosely in the groove 73. In some cases, such as when used in large spring devices, the rod 70 may have two or more lengthwise grooves 73 and two or more spiral grooves 75 and one or more pins may be provided to engage in each of the grooves 73 and 75, respectively.

Two or more radial pins 78 may be threaded in the collar or fastened in any other suitable manner, and a round brake shoe member 79 may have an axial hole for engaging loosely around each pin 78. A cup shaped member 80 may be fastened on the end of the member 72 as by screws 81 and have an axial hole through its end wall to permit the passage therethrough of the rod 70. The shoe members 79 are slightly shorter than the distance along a pin 77 from the collar to the inner face of the wall of the cup 80.

The principle of operation of the above described governor device will be clear to those skilled in mechanics.

In Figure 9 is diagrammatically shown a spring device which includes a combination of spring devices such as are shown in Figures 1 and 5. It will be noted that the linkage 52 is indicated as being pivotally fastened to one of the pull bars 7 midway between its ends. It can be readily seen that the pull bar 7 to which is fastened the linkage 52 should be stronger than the other pull bar 7, and it is so indicated in Figure 9 by a heavier black line than is used to represent the other pull bar. It will be clear to those understanding the principles of resolution of forces that the forces (indicated by the arrows) required to substantially straighten the linkages 34 and 35 must do this work against the force required to substantially straighten the linkage 52; and the linkage 52 must be straightened against the force required to straighten the linkages 10 against the action of the springs 20.

Tension carrying members 90 connect the pull bar 31 with the pull bar 7 farthest from the pull bar 31. These connecting members 90 are required in order for the weaker pull bar 7 and the pull bar 30 and the linkages 34 and 35 to cooperate in performing their joint functions. The pull bar 31 of the device shown in Figure 9 will be formed of two plates (similar to plates 32) which will be spaced far enough apart to permit the adjacent (strongest) pull bar 7 to be moved between them.

In Figure 10, is diagrammatically illustrated a spring device which includes the combination of two spring devices of the kind shown in Figure 5. It will be noted that the linkage 52 of one device is pivotally connected to the pull bar 30 of the other device midway between its ends. It can be readily seen that the last named pull bar 30 should be stronger than the pull bar 31 of the same spring device and it is so indicated in Figure 10.

Tension-carrying members 91 connect the pull bars 31. These connecting members are required in order for the leftmost pull bar 31 and its associated linkages 34 and 35 and the rightmost pull bar 31 to cooperate in performing their functions.

It is believed that the functioning of the spring device shown in Figure 10 can be understood from a consideration of the explanation of the device shown in Figure 9.

Figure 11:
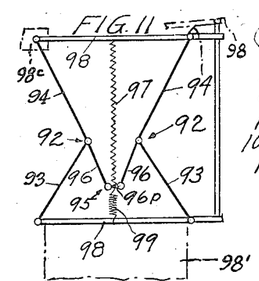
Figure 11 is a diagrammatic view of a modified form of the spring device shown in Figure 5.

In Figure 11 is diagrammatically illustrated an embodiment of my invention in which two oppositely disposed linkages generally designated as 92 are each made up of a link 93 and a link 94, the latter link being shorter than the first named one. The linkages 92 are connected by a linkage 95 which is made up of two links 96 of equal length and an intermediate connecting piece 96p. A compression spring 97 is disposed between the piece 96p and an upper (as viewed in Figure 11) pull bar 98. A tensile spring 99 is fastened between the cross-piece 96p and a lower (as viewed in Figure 11) pull bar 98.

It can be readily seen, that when the pull bars are moved away from each other that each of the springs is strained and cooperates with the linkages to yieldingly resist the movement apart of the pull bars. In employing devices of the kind shown in Figure 11, in cases where a relatively great movement apart of the pull bars 98 is desired, the linkage 95 and the spring 99 will be arranged so that the latter will never be over extended. The Figure 11 device is further described hereinafter.

Figure 12:
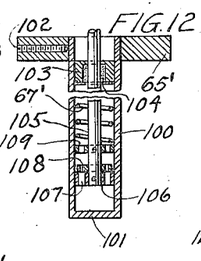
Figure 12 is a fragmentary sectional view of a hydraulic type of governor device applied to a spring device of the kind shown in Figure 5.
Figure 13:
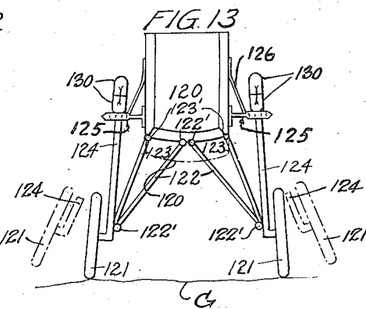
Figure 13 is a diagrammatic front end view of an airplane, shown in part, illustrating how my spring device may be applied thereto for absorbing landing shock. The dot-and-dash outlines of the airplane landing gear wheels represent the movement of the wheels relative to the fuselage of the airplane when the wheels strike the ground. The angular movement of the wheels sidewise is exaggerated.

In Figure 12 is illustrated how a hydraulic type of governor device may be applied to the spring device shown in Figures 5 and 6 for controlling the rate of movement apart of the pull bars 30 and 31 under action of oppositely directed forces acting on them.

A cylinder 100 which has one end closed by an integral head portion 101 may be fastened in the plate 65' (shown to an enlarged scale in Figure 12) by providing an aperture in the plate for receiving the cylinder and providing one or more set screws 102 for bearing against the cylinder 100. The upper end of the cylinder may be closed by a plug 103 having an oil tight stuffing box device 104 through which a piston rod 105 (which replaces rod 63) extends up out of the cylinder. To the inner end of the rod 105, is fastened a piston 106 which may fit closely in the cylinder. A spring 67' will be disposed around the rod 105. The cylinder 100 is normally filled with a suitable oil or other fluid, and to permit the piston 106 and the rod 105 to move in the oil filled cylinder in accordance with the movement of the pull bars 30 and 31, some kind of a valve device is necessary to pass the oil by the piston. Such a valve device may be provided in various well known forms. As shown in Figure 12, a valve device is arranged by providing a plurality of relatively large holes 107 through the piston 106 and providing a valve disc 108 having a plurality of small perforations positioned to come over the holes 107. The valve disc 108 will fit loosely on the rod 105 for up and down movements relative thereto and will be smaller in diameter than the piston 106 and will have suitable means (not shown) to prevent its rotating with respect to the piston. A perforated disc 109 is fastened on the rod 105 above the valve disc.

It can be readily seen by those skilled in springs and spring devices that my spring device can be advantageously applied to a number of machines, devices, etc. In Figures 13 to 18 inclusive, it is illustrated how my spring device can be applied to an airplane landing gear for cushioning the landing shock.

The airplanes which may be of the split axle type include a fuselage 120, landing gear wheels 121, and landing gear struts 122 and 123 which may be of usual construction. The struts may be hingedly fastened to the fuselage 120 and to a shock-absorbing strut 124 as is diagrammatically indicated in Figure 13.

Figures 14, 15, 16, 17, 18:
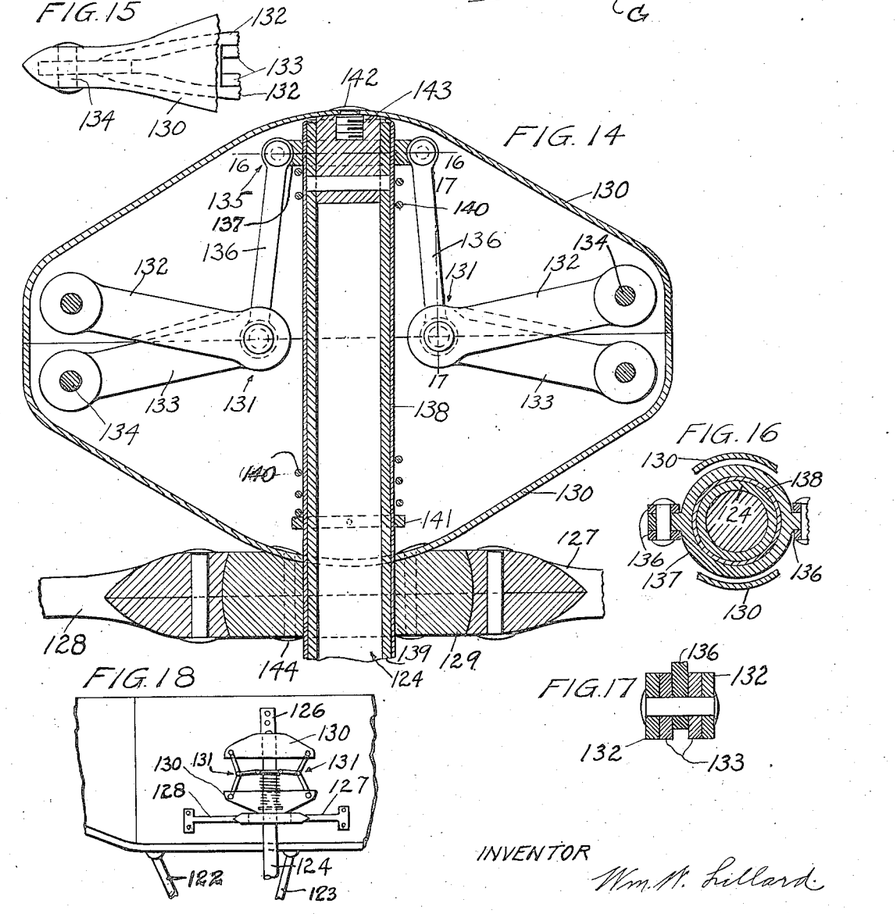
Figure 14 is a fragmentary side view, broken away in part, and shown mostly in section, of a suitable spring device embodying my present invention, applied to an airplane.
Figure 15 is a fragmentary top view of the structure shown in Figure 14.
Figure 16 is a fragmentary cross-section taken along the line 16—16 of Figure 14.
Figure 17 is a cross-section taken along the line 17—17 of Figure 14.
Figure 18 is a diagrammatic side view of the spring device shown in Figure 14, the device being shown in operative position as when the airplane strikes the ground.

Each of the struts 124 extends from the associated wheel 121 upward to a bracket frame generally designated as 125 and which may include an upwardly inclined bracket arm 126 and two lateral bracket arms 127, 128, joined to each other and fastened to the arm 126. The juncture of the arms 127 and 128 may be arranged with a swivel or knuckle member 129 as shown in Figure 14, for a purpose to presently appear. The upper end portion of each strut 124 passes through a hole provided in the member 129 which moves downward relative to the strut when the wheels 121 strike the ground and spread apart in a well known way.

A form of my spring device constructed similarly to the devices shown in Figures 5 and 11 may be connected between the upper end of the strut 124 and the knuckle 129. Since it is very desirable to reduce the wind resistance of all exposed parts on an airplane, pull bar members 130 for the spring device to connect each strut 124 and its associated knuckle are provided which will preferably be made of sheet metal substantially in the form shown in Figures 14, 15 and 16. Figure 14 shows a side view of the pull bar members substantially broken away on a longitudinal vertical plane to show more clearly the construction of other parts of the spring device.

The upper and the lower pull bar members 130 may be connected by two linkages 131, one positioned on each side of the strut 124 (Figure 14). Each linkage 131 includes an upper link 132 and a lower link 133 pivotally fastened to the upper and the lower pull bar members, respectively, by bolts or pins 134. In embodiments of my invention, the linkages employed are usually deflected somewhat toward or away from each other in starting position. Linkages disposed in such a manner are hereinafter sometimes called deflected linkages for sake of brevity. It will be understood that, for the purposes of the present invention, such linkages may be constructed of pivotally connected links, or of other suitable equivalent devices, such as, for example sections of rope or chain.

The linkages 131 are operatively connected by an intermediate linkage 135 which may include two links 136, positioned on each side of the strut 124, and a collar member 137 which may be substantially as shown in Figures 14 and 16. The collar 137 is provided with a hole for sliding up and down around a thin cylinder 138 of suitable strong alloy steel which may form a hard bearing shell over an inner hollow rod member 139 of the strut 124 which member may be made of a lighter and softer metal such as duralumin. The strut 124 may be made in one piece of steel if desired. A spring 140 is disposed around the strut 124 between the collar 137 and a collar 141 fastened on the strut 124 in any suitable way adjacent the member 129. To illustrate more clearly the construction of the strut 124, the collars 137 and 141, and the cylinder 138, these parts are shown in section in Figure 14.

The upper end of the strut 124 may be fastened to the upper pull bar member 130 by a plug 142 and screw 143 substantially as shown in Figure 14 or in any other suitable way. The lower pull bar member 130 may be fastened securely to the knuckle 129 by a plurality of rivets 144.

By inspection of Figure 18, it can be seen that when the airplane is landing, each swivel member 129 is moved downward with respect to its strut 124, and the linkages 131, the linkages 135 and the springs 140 cooperate to cushion the landing shock.

The pull bars in a spring device embodying my invention may be differently constructed, and in some cases one or both pull bars may be omitted and the links fastened to a suitable part or parts of the machine, etc. In Figure 14, the links 133 may be said to be fastened to a cowling member of the airplane.

Figures 19, 20, 21, 22, 23:
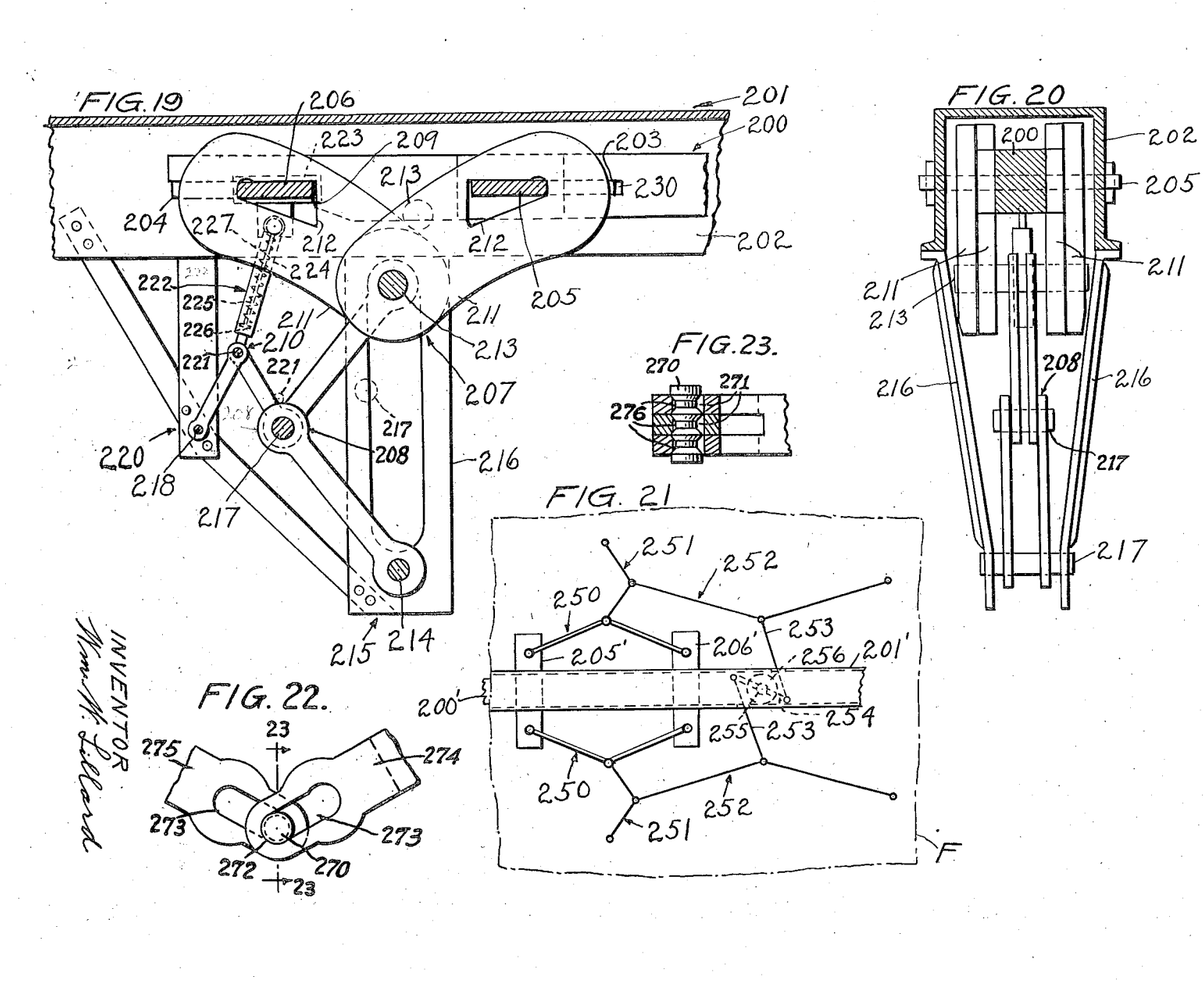
Figure 19 is a side view, broken away in part illustrating the application of my resilient device to draft gear mechanism of a railroad car.
Figure 20 is an end view, of the structure shown in Figure 19, part of it being broken away.
Figure 21 is a diagrammatic plan view illustrating another arrangement of my resilient devices which may replace the structure of Figure 19.
Figure 22 is a partial side view of two links of a linkage connected by a novel pivot member which construction may be advantageously used in certain embodiments of my invention.
Figure 23 is a partial cross-section along the line 22—22 of Figure 22.

In Figure 19, another form of my invention is shown as constituting a part of draft gear mechanism for a railroad car for relieving the shocks which result from force being suddenly applied to a draw bar member 200. The forward end of the draw bar may have usual car coupling devices (not shown). Practically every railroad car is ordinarily constructed with a strong center column member 201 of steel which extends lengthwise of the car under the floor in a well known way. Through side walls 202 of the column 201, I cut a pair of elongated front and rear slots 203 and 204, respectively, for receiving with a sliding fit, front and rear key members 205 and 206, respectively. The heavy strains coming on the draw bar 200 are transmitted through these key members and shock absorbing mechanism presently to be described to the column 202. When a railroad car is stationary the keys 205 and 206 are each held against the inner ends of its pair of slots by a constant force resulting from the coaction of a strong primary linkage generally designated as 207, a secondary linkage generally designated as 208, and another secondary linkage generally designated as 210, and resilient means presently to be described.

The linkage 207 comprises four links 211, each having a suitable opening 212 for cooperation with the associated key which extends through the opening. A large pivot member 213 connects the links 211. One end of the linkage 208 is connected to the pivot member 213 and the other end is pivoted about a pin 214 mounted in a dependent frame 215 which is made up of two members 216 fastened in a suitable way to the column 201. One end of the linkage 210 is pivotally fastened to a pivot member 217 of the linkage 208 and the other end is pivotally fastened to a pin 218 mounted in a dependent frame structure 220 fastened in a suitable way to the column 201 and to the frame 215.

To the pivot member 221 of the linkage 210 one end of a fluid type dash pot device generally designated as 222 is fastened. The other end of the dash pot device may be pivotally fastened to a strap device 223 engaging around the key 206 between the rear links 211. The dash pot device may be of similar construction and function in similar manner to the dash pot structure of Figure 12, but a cylinder member 224 of the dash pot is preferably arranged to move downwardly relatively to a piston rod 225 and a piston 226 working inside the cylinder. The piston rod 225 is fastened to the strap 223 and therefore does not move downwardly with the cylinder. A coiled spring 227 is disposed around the piston rod 225 so as to be compressed when the linkage 210 is moved toward a straight line position and the cylinder member 224 moves downwardly.

The structure of Figure 19 operates as follows. When the draw bar 200 is moved outward (to the right is viewed in Figure 19) such as would occur when a locomotive (not shown) connected to the draw bar moves ahead, the key 205 which passes through an elongated slot 230 in the draw bar engages the forward links 211 and tends to straighten out the linkage 207. This occurs because the key 206 at that time engages against the forward ends of the slots 204. The straightening of the linkage 207 straightens the linkages 208 and 210 against the resistance originated by the spring 227 and the dash pot 222. The action of the linkage of Figure 19 will be understood from the explanation hereinafter of the operation of the linkages of Figure 5.

When the draw bar 200 is pushed inwardly (to the left) the key 206 is moved rearwardly at once, since it abuts against a shoulder 209 of the draw bar 200, but the key 205 is not moved since the slot 230 is long enough to provide for an idle movement of the draw bar relative to the key 205, and also the key 205 abuts against the rear ends of the slots 203 in the column 201. Consequently the linkage 207 is moved toward a straight line position upon the rearward movement of the draw bar 200, against the force originated by the spring 227 and the dash pot 222.

In Figure 21 is illustrated another arrangement of a linkage means embodying my invention which is similar in some respects to the linkage means of Figure 19. A draw bar 200', a column 201', and key members 205' and 206' may be substantial duplicates of the parts 200, 201, 205 and 206 of Figure 19, except for a reason to soon appear, the key members 205' and 206' will preferably extend out farther from each side of the column 201 than do the key members 205 and 206.

Two strong primary linkages 250 may connect the protruding ends of the key members. To the central pivotal connection of each of the linkages 250, one end of a secondary linkage 251 may be connected, and the other end of each linkage 251 may be pivotally fastened to a member which may be carried in some suitable way by the usual framework (not shown) which supports the floor F of the car. To the central pivotal connection of each of the linkages 251, there may be pivotally fastened one end of another secondary linkage 252, the other end of which may be pivotally fastened to similar means described above for the linkages 251. The linkages 250, 251 and 252 may be arranged approximately as shown in Figure 21. In special cases however, it will be understood that very different arrangements of the linkages of the structures of Figures 19 and 20 may be devised, if desired.

The central pivotal connections of the linkages 252 are each connected by a link 253 to one end of a cross arm 254 which may be fastened to the axle or pivot member 255 of a fluid type shock absorber 256 of a well known type widely used in automobiles.

This shock absorber may be mounted inside or below the column 201' and the links 253 may pass through holes cut in the side walls of the column to a connection with the cross arm 254. A suitable return spring (not shown) may be mounted inside the shock absorber 256.

It can be readily seen that the linkage 252 may be disposed in a plane arranged in angular relation to the plane of the linkage 251. When such is done, the connection between each linkage 251 and 252 may include a swivel fastening of a well known kind. It will be understood that such angular relation between the planes of the linkages 251 and 252 should not be excessive. Also, it may be desirable in some cases, to provide fixed guiding means for the linkages 251 when arranging the linkages 251 and 252 in planes angularly disposed one to the other.

In Figures 22 and 23 are shown views of a novel pivotal connection which may be used to increase the resistance of a deflected linkage to forces operating to straighten it. A pivot pin generally designated as 270 is made with a plurality of annular grooves 271 the sides of each groove being inclined toward the center. For cooperation with the grooves 271 rim portions 272 around pivot-receiving openings 273 in links 274, 275 are arranged with sloping sides 276 corresponding to the slopes of the grooves 271.

A central pivotal connection of a deflected linkage employing a pin such as shown in Figure 23 may be constructed to considerably increase the resistance of the linkage to straightening tensile forces acting on the linkage when it is nearly straight but will increase the friction of the connection very little while the linkage is being initially moved from its starting or deflected position.

It can be readily seen that the reverse toggleages and compound reversed toggleages disclosed hereinbefore may be employed with various kinds of springs other than the simple helical springs illustrated in the drawings. Also, other resilient means such as weights and inclosed air columns may be employed with the reversed toggleages in place of springs. It can be seen by those skilled in mechanics that the arrangement of coacting deflected linkages as disclosed in the present application is somewhat similar to well known organizations of toggle links usually called toggleages. In these toggleages as they are commonly employed, the toggle links usually transmit compressive forces. Since the links in my spring device operate in an opposite or reverse way from usual toggle links by being arranged for the transmission of tensile forces only, my arrangement of linkages as illustrated, for example, in Figure 1 will hereinafter for sake of brevity, be sometimes called a reversed toggleage. Also, the arrangement of linkages as shown in Figures 5 and 19 sometimes will be called a compound reversed toggleage since it may be correctly said to constitute a compound organization of linkages.

It has been found in practice that a spring device embodying the kind of reverse toggleage shown in Figure 1 will operate when the pull bars are moved apart in the same plane considerably out of parallelism. A spring device embodying the kind of compound reversed toggleage shown in Figure 11 may have the lower pull bar (as viewed in Figure 11) fastened rigidly to a stationary part of a structure 98', and have a pivotal connection 98c at the left end of the upper pull bar 98 which connection may be held against bodily movement relative to the structure 98'. Then if the upper pull bar 98 is moved as indicated in dotted lines the springs 97 and 99 will operate only through the linkage 95 and right hand linkage 92 and tend to move the upper pull bar to the solid line position. The structure of Figure 11 when arranged for operation as described above in this paragraph may serve as a clamping device to tightly hold a work piece W which can be quickly released. Obviously, my resilient devices can be arranged in other ways to serve as clamping means.

It will be understood by those skilled in the art that any of the forms of my spring device will operate when one pull bar is held stationary and the other is moved away relatively thereto, as is done in the form shown in Figure 14.

Variations may be resorted to within the scope of my invention, and portions of the improvement may be used without others.

Having thus described my invention, I claim:

1. A resilient device including two members spaced apart and disposed opposite each other, a linkage connecting each end of one member to the adjacent end of the other member, a linkage connected between the first-named linkages intermediate said members, and resilient means acting on said last named linkage effective to deflect it from a straight line between its ends, the deflection of said last-named linkage being effective to deflect said first-named linkages one toward the other, said linkages being arranged so that movement apart of said members will cause the straightening of all of said linkages and the straining of said resilient means.

2. In an airplane having a fuselage, the combination with a landing-gear strut which is moved upwardly and outwardly relative to said fuselage when said airplane is landing, of a spring-controlled reversed toggleage resilient device operatively connected between said strut and said fuselage, and means including swiveling instrumentalities for connecting said toggleage device to said fuselage, said toggleage device being arranged to present a minimum resistance to the wind while said airplane is flying.

3. In a resilient device, in combination, two linkages, a member for connecting the end of one linkage to an end of the other linkage, a member for connecting the remaining ends of said linkages, said linkages being spaced apart by said members, and resilient means urging portions of said linkages toward each other, the arrangement of said members and said linkages being such that the movement apart of said members will move the urged linkage portions away from each other against the action of said resilient means.

4. In a resilient device, in combination, two linkages, a member for connecting the end of one linkage to an end of the other linkage, a member for connecting the remaining ends of said linkages, and resilient instrumentalities urging portions of said linkages toward each other, said instrumentalities including a linkage connected between said two first-named linkages intermediate said members, and a spring acting on said last-named linkage in a way to move said first-named linkages toward each other, and to move said members toward each other.

5. In a resilient device, a reversed toggleage including oppositely disposed linkages deflected toward each other, and a deflected linkage arranged to be straightened by straightening said oppositely disposed linkages.

6. In a resilient device, a spring, and a compound reversed toggleage operatively connected to said spring for increasing the power of the latter to provide a large yielding resistance to forces acting in opposite directions on said device.

7. In a resilient device, two oppositely disposed linkages deflected toward each other, members connected to the ends of said linkages whereby a force can be applied to said linkages which will tend to straighten them, and resilient means for resisting said straightening of said linkages including a deflected linkage and a spring connected to said last-named linkage and to one of said members so as to be strained upon movement of said last-named linkage caused by the straightening of said first-named linkages.

8. The structure described in claim 7 characterized by said last-named linkage being of such a length that it becomes substantially straight when said first-named linkages are substantially straight.

9. The structure described in claim 7 characterized by a governor device arranged for co-operation with said spring to resist the straightening of said last named linkage.

10. The structure described in claim 7 characterized by a governor device arranged for co-operation with said spring, said governor device effective to resist the straightening of said last-named linkage by the force acting on said resilient device and also to resist the sudden deflection of said last-named linkage by said spring when said force ceases to affect said resilient device.

11. In an airplane having a fuselage, the combination with a landing gear strut which is displaceable upwardly and laterally upon the landing of said airplane, of a yielding connection between said fuselage and said strut including a reverse toggleage resilient device effective to relieve landing shocks transmitted to said fuselage through said strut, and means permitting sidewise movement of said strut and said device.

12. The structure described in claim 11 characterized by said toggleage device including a governor mechanism which is effective to reduce the rebound action of said device upon the landing of said airplane.

13. In a resilient device, in combination, spring means, a reversed-toggleage linkage unit operatively connected to said spring means so as to provide a yielding resistance to forces acting on said unit whereby to strain said spring means which resistance is greater than the yielding resistance offered by said spring means alone in resisting strain by said forces, a compound-reversed-toggleage linkage unit, and means for operatively connecting said compound unit to said first-named unit for cooperation therewith to provide a yielding resistance greater than said first-named resistance to forces applied to said device tending to move said units in opposite directions.

14. In a draft gear for a railroad car having a hollow longitudinal supporting column, a draw bar member disposed in said column for movement in either direction, and shock-relieving means for connecting said draw bar member to said column, said means including a spring and a coacting reversed toggleage.

15. The structure described in claim 14 characterized by means making said shock-relieving means effective when said draw bar member is moved in either direction.

16. In a resilient device, a spring, a mounting means having one end of said spring attached thereto, a plurality of deflected linkages, one of said linkages having an intermediate pivot member fastened to the free end of said spring, each of the other of said linkages being connected one to another, and with one of said other linkages connected to the free end of said first named linkage so as to make said spring effective for resisting the straightening of all of said linkages.

17. A resilient device including two members spaced apart opposite from each other in substantially the same plane, two flexible instrumentalities, one fastened to each end of one of said members and extending therefrom to the adjacent end of the opposite member to be fastened thereto, each of said flexible instrumentalities deviating from a straight line toward the other instrumentality, and an extensible spring device disposed between said instrumentalities for yieldingly resisting the straightening of said instrumentalities when said members are moved in opposite directions, said spring device and said members arranged with respect to each other whereby the substantial straightening of said instrumentalities will not strain said spring device excessively.

18. A resilient spring device including a linkage which deviates from a straight line through the ends of said linkage, two compression-receiving members separately connected to said linkage, one to each end thereof, means guiding said members relative to said straight line through said linkage ends whereby oppositely directed forces acting on said members will tend to straighten said linkage, a spring connected with said linkage intermediate its ends and a support for said spring, the arrangement of said spring and said support being such that said spring will resist the straightening of said linkage.

19. In combination, a linkage which deviates from a straight line through its ends, a member effective for resisting a pull, one end of said linkage connected to said member, a compression-receiving member connected to the other end of said linkage, a spring connected with said linkage intermediate its ends, a support for said spring, the arrangement of said spring and said support being effective whereby the straightening of said linkage will strain said spring, and devices for guiding said compression-receiving member along a fixed path relative to said first named member, said path being disposed whereby a compressive force acting on the end of said compression-receiving member opposite from said linkage will be resisted by the coaction of said spring and said linkage which will ultimately be a force many times the resilience of said spring.

20. In combination, a first linkage, a second linkage, said linkages each being deflected, one toward the other, means for applying power to the ends of said first linkage so as to tend to straighten the same, means for applying power to the ends of said second linkage so as to tend to straighten the same, and resilient, spring-like means connected between said deflected linkages, the coaction of said linkages and said spring-like means being such that the application of power much greater than that of said spring-like means to the ends of said linkages is necessary to approximately straighten them against the action of said spring means, said deflected linkages and said spring-like means being arranged with respect to each other whereby the approximate straightening of said linkages will not strain said spring-like means excessively.

21. In combination, a first linkage, a second linkage, said linkages each being deflected, one toward the other, means for applying power to the ends of said first linkage so as to tend to straighten the same, means for applying power to the ends of said second linkage so as to tend to straighten the same, and a deflected flexible device connected between said first and said second deflected linkages so as to be approximately straightened upon the approximate straightening of said first and second linkages, said device including resilient means effective for resisting the straightening movement of said connecting device caused by straightening movements of said first and second linkages under action of power applied to their ends.

22. In a draft gear for a railroad car having a supporting column, a draw bar member disposed in said column for movement in either direction, and shock-relieving means for connecting said draw bar member to said column, said connecting means including a deflected linkage, devices effective to make the movement of said draw bar member in either direction tend to straighten said linkage, a spring connected with said linkage intermediate its ends so as to resist the straightening of said linkage, and a dash pot device connected with said linkage intermediate its ends and arranged to modify the speed of the straightening movement of said linkage.

WILLIAM W. LILLARD.